United States Patent
Davis et al.

(10) Patent No.: US 6,833,127 B2
(45) Date of Patent: Dec. 21, 2004

(54) METHOD OF REMOVING STRUCTURE DIRECTING AGENTS FROM MOLECULAR SIEVES

(75) Inventors: Mark E. Davis, Pasadena, CA (US); Hyunjoo Lee, Pasadena, CA (US); Stacey I. Zones, San Francisco, CA (US)

(73) Assignees: California Institute of Technology, Pasadena, CA (US); Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 10/461,258

(22) Filed: Jun. 12, 2003

(65) Prior Publication Data

US 2004/0052726 A1 Mar. 18, 2004

Related U.S. Application Data

(63) Continuation-in-part of application No. 10/032,171, filed on Dec. 20, 2001, now abandoned.
(60) Provisional application No. 60/257,826, filed on Dec. 22, 2000.

(51) Int. Cl.$^7$ .......................... C01B 37/00; C01B 39/04
(52) U.S. Cl. ...................... 423/702; 423/704; 423/705; 423/706; 423/DIG. 22; 423/DIG. 30; 423/DIG. 36; 423/305; 423/306; 423/511; 423/560; 423/561.1; 423/606; 502/85; 502/208; 502/214; 502/216; 502/305

(58) Field of Search ................... 423/305, 306, 423/702, 704, 705, 706, DIG. 22, DIG. 30, DIG. 36, 511, 560, 561.1, 606; 502/85, 208, 214, 216, 305

(56) References Cited

U.S. PATENT DOCUMENTS

| | | | | |
|---|---|---|---|---|
| 4,851,200 A | * | 7/1989 | Ryan | 423/715 |
| 5,143,879 A | * | 9/1992 | Whitehurst | 502/85 |
| 5,425,934 A | * | 6/1995 | Malla et al. | 423/714 |
| 5,925,330 A | * | 7/1999 | Roth | 423/702 |
| 6,448,197 B1 | * | 9/2002 | Liu et al. | 502/210 |
| 6,645,899 B1 | * | 11/2003 | Palmery et al. | 502/85 |
| 2002/0164283 A1 | * | 11/2002 | Jones et al. | 423/702 |

FOREIGN PATENT DOCUMENTS

EP  1101735 A1 * 5/2001 ........... C01B/39/02

* cited by examiner

*Primary Examiner*—David Sample
(74) *Attorney, Agent, or Firm*—Richard J. Sheridan

(57) ABSTRACT

A structure directing agent is removed from a microporous solid at a temperature below the temperature that would cause the structure directing agent to decompose by cleaving the structure directing agent within the pores of the microporous solid, at a temperature below the temperature that would cause the structure directing agent to decompose, into two or more fragments and removing the fragments from the pores of the microporous solid at a temperature below the temperature that would cause the structure directing agent or its fragments to decompose.

100 Claims, No Drawings

METHOD OF REMOVING STRUCTURE DIRECTING AGENTS FROM MOLECULAR SIEVES

This application is a continuation-in-part of application Ser. No. 10/032,171, filed Dec. 20, 2001, now abandoned, which in turn claims the benefit of U.S. Provisional Application No. 60/257,826, filed Dec. 22, 2000.

BACKGROUND OF THE INVENTION

Microporous solids such as molecular sieves (e.g., zeolites) are often synthesized using a "structure directing agent" (SDA). The SDA apparently assists in organizing the atoms of the molecular sieve into a particular crystalline topology. The SDA may typically be an organic amine, quaternary ammonium compound or organometallic compound. Once the microporous solid is synthesized, the SDA is in the pores of the microporous solid and is quite often spatially trapped. In order to remove the SDA from the pores, the microporous solid is normally heated to a very high temperature, i.e., calcined, to decompose the SDA and release the smaller decomposition produces from the pores. However, calcination can have deleterious effects on the microporous solid, and destroys the SDA, preventing its reuse. Calcination may also cause environmental problems due to the effluent gases formed.

It would, therefore, be desirable to be able to remove the SDA from a microporous solid without having to calcine it. It would also be desirable to be able to recover the SDA in a form such that it can be reused.

SUMMARY OF THE INVENTION

In accordance with the present invention, there is provided a method of removing a structure directing agent from a microporous solid at a temperature below the temperature that would cause the structure directing agent to decompose comprising cleaving the structure directing agent within the pores of the microporous solid, at a temperature below the temperature that would cause the structure directing agent to decompose, into two or more fragments and removing the fragments from the pores of the microporous solid at a temperature below the temperature that would cause the structure directing agent or its fragments to decompose.

Further provided in accordance with the present invention is a method of removing a structure directing agent from a porous molecular sieve at a temperature below the temperature that would cause the structure directing agent to decompose comprising cleaving the structure directing agent within the pores of the molecular sieve, at a temperature below the temperature that would cause the structure directing agent to decompose, into two or more fragments and removing the fragments from the pores of the molecular sieve at a temperature below the temperature that would cause the structure directing agent or its fragments to decompose. Preferably, the SDA is decomposed into fragments that can be recombined ex situ for recyclable use.

The present invention also provides a method of making a porous, crystalline molecular sieve comprising:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) a structure directing agent capable of forming the molecular sieve;

(b) maintaining the aqueous solution under conditions sufficient to form porous crystals of the molecular sieve which contain the structure directing agent in the pores; and (c) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

The present invention also provides a method of making a porous, crystalline molecular sieve comprising:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) a structure directing agent capable of forming the molecular sieve; and (5) an amine component comprising at least one amine containing one to eight carbon atoms, ammonium hydroxide and mixtures thereof;

(b) maintaining the aqueous solution under conditions sufficient to form porous crystals of the molecular sieve which contain the structure directing agent and the amine component in the pores;

(c) removing the amine component from the pores of the molecular sieve at a temperature below the temperature that would cause the structure directing agent or the amine component to decompose; and (d) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

Further provided by the present invention is a method of making a microporous solid comprising:

(a) preparing a reaction mixture comprising at least one active source of reactants required to produce the microporous solid, a structure directing agent capable of forming said microporous solid, and sufficient water to shape said mixture into a self-supporting shape;

(b) heating said reaction mixture at crystallization conditions and in the absence of an external liquid phase for sufficient time to form the microporous solid containing the structure directing agent; and (c) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

Also provided in accordance with this invention is a method of making a microporous solid comprising:

(a) preparing a reaction mixture comprising at least one active source of reactants required to produce the microporous solid, a structure directing agent capable of forming said microporous solid, an amine component comprising at least one amine containing one to eight carbon atoms, ammonium hydroxide and mixtures thereof, and sufficient water to shape said mixture into a self-supporting shape;

(b) heating said reaction mixture at crystallization conditions and in the absence of an external liquid phase for sufficient time to form the microporous solid containing the structure directing agent and the amine component; and (c) removing the amine component from the pores of the molecular sieve at a temperature below the temperature that would cause the structure directing agent or the amine component to decompose; and (d) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

DETAILED DESCRIPTION OF PREFERRED EMBODIMENTS

The present invention provides a method for removing an SDA from a microporous solid in a manner that does not require the use of high temperatures. As used herein, the term "microporous solid" refers to solid materials that contain pores within their structure. The size of the pores can range from about 3 Angstroms to about 20 Angstroms in diameter (normally measured along the longest axis). The microporous solids are typically crystalline materials with a particular crystal topology. Examples of microporous solids include molecular sieves, zeolites, silicoaluminophosphates (SAPO's), aluminophosphates (ALPO's), inorganic oxides, inorganic sulfides and hetero polytungstates. Specific examples include, but are not limited to zeolite beta, ZSM-5, SSZ-25, SM-3, SSZ-32, SSZ-13, SSZ-33 and ZSM-23.

As used herein, the term "structure directing agent" or "SDA" refers to compounds found within the pores of the microporous solid after it is made. Sometimes referred to as a "guest molecule" the SDA is found inside the lattice of the microporous solid. The SDA has a close spatial fit within the micropore regions of the microporous solid. It is believed the SDA assists in arranging the atoms of the microporous solid into a particular pattern. Often, the SDA can specify nucleation of one microporous crystalline solid over others. In some cases, an SDA might be associated with the formation of only a single microporous structure. Normally, an SDA is large enough in relation to the size of the pores of the microporous solid that it becomes trapped inside the pores when the microporous solid is formed. In many cases, the only way to remove the SDA from the pores of the microporous solid is to heat the microporous solid to a temperature at which the SDA decomposes (i.e., calcining the microporous solid). In accordance with the present invention, the SDA is removed from the microporous solid by "cleaving" it within the pores of the microporous solid. The term "cleaving" as used herein means breaking the SDA into two or more fragments at a temperature below the temperature at which the SDA decomposes. The cleaving can be accomplished by breaking covalent bonds within the SDA, or by otherwise fragmenting the SDA, such as by removing ligands from the metal atom in an organometallic compound. The SDA's fragments are then small enough in relation to the pores of the microporous solid that they can be removed without the need for calcination. The present invention is especially useful for SDA's that can not be removed from the microporous solid by non-thermal techniques such as solvent extraction.

The fragments of the cleaved SDA can be removed from the pores of the microporous solid at a temperature of less than about 300° C. This helps avoid possible alteration or destruction of the microporous solid that may occur at typical calcination temperatures of about 350 C to about 400 C or above, as well as avoid the total destruction of the SDA.

Once the SDA has been cleaved, its fragments can be removed from the pores of the microporous solid by techniques such as solvent extraction, vaporization, sublimation or vacuum evaporation. If the technique for removing the SDA fragments is solvent extraction, the preferred solvents are polar solvents when the SDA is charged (e.g., the SDA is a quaternary ammonium compound). Examples of such solvents include dimethylformamide (DMF) and ethylene glycol. Once the fragments have been extracted, the microporous solid can be washed with water and dried.

Conditions (temperature, pressure, etc.) for removal of the SDA fragments from the microporous solid will vary depending upon the particular microporous solid, the size of the SDA relative to the pores, the size of the SDA fragments relative to the size of the pores, and the like.

The microporous solids useful in the present invention are solids having internal pores in their structure. The size of the pores may range from about 3 Angstroms to about 20 Angstroms. Often, the microporous solids have a particular crystalline topology. Examples of microporous solids that can be used in this invention include, but are not limited to molecular sieves, zeolites, silicoaluminophosphates (SAPO's), aluminophosphates (ALPO's), inorganic oxides, inorganic sulfides and hetero polytungstates. Microporous solids other than those listed above may also be useful.

The manner of making the SDA-containing microporous solid is not critical. Standard synthesis techniques can be used. For example, when the microporous solid is a silicate or metallosilicate zeolite, the zeolite can be made by forming a reaction mixture from sources of alkali and/or alkaline earth metal (M) cations with valences n (i.e., 1 or 2); sources of an oxide of aluminum, boron, iron, gallium, indium, titanium, vanadium or mixtures thereof (W); sources of an oxide of silicon, germanium or mixtures thereof (Y); an SDA (Q); and water, said reaction mixture having a composition in terms of mole ratios within the following ranges:

| Reactants | General | Preferred |
| --- | --- | --- |
| $YO_2/W_aO_b$ | 20–∞ | 25–90 |
| $OH^-/YO_2$ | 0.10–0.50 | 0.15–0.30 |
| $Q/YO_2$ | 0.05–0.50 | 0.10–0.30 |
| $M_{2/n}/YO_2$ | 0.02–0.40 | 0.01–0.30 |
| $H_2O/YO_2$ | 10–100 | 25–50 | where Y is silicon germanium or a mixture thereof, W is aluminum, boron, gallium, indium, iron, titanium, vanadium or mixtures thereof, Q is an SDA capable of forming the desired molecular sieve, M is an alkali metal cation, alkaline earth metal cation or mixtures thereof, n is the valence of n (i.e., 1 or 2), a is 1 or 2, and b is 2 when a is 1 (i.e., W is tetravalent) and b is 3 when a is 2 (i.e., W is trivalent).

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Gallium, iron, boron, indium, titanium, vanadium and germanium can be added in forms corresponding to their aluminum and silicon counterparts. Trivalent elements stabilized on silica colloids are also useful reagents.

In preparing the zeolites, the reactants and the SDA are dissolved in water and the resulting reaction mixture is maintained at an elevated temperature until crystals are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days. The reaction mixture is preferably stirred during crystallization.

Once the zeolite crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of the desired zeolite both to direct, and accelerate the crystallization, as well as to minimize the formation of any undesired crystalline phases. When seed crystals are used, typically about 0.5% to about 5.0% by weight (based on the weight of silica used in the reaction mixture) of the seed crystals are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The SDA can also be used in combination with an amine component to prepare the molecular sieve. The use of a combination of an SDA and an amine component is disclosed in U.S. Pat. No. 5,785,947, issued Jul. 28, 1998 to Zones et al., which is incorporated by reference herein in its entirety. The use of the combination of an SDA and amine component provides several advantages including permitting the use of less SDA. It also allows the amine to be removed from the pores of the synthesized zeolite by relatively simple techniques, such as solvent extraction. Removal of the amine from the pores of the zeolite makes room in the pores for a reactant to enter the pores and cleave the SDA.

When a combination of an SDA and amine component is used, the reaction mixture should have a composition in terms of mole ratios falling within the following ranges:

|  | Broad | Preferred |
|---|---|---|
| $M_{2/n}/YO_2$ | 0.01–0.50 | 0.10–0.20 |
| $OH^-/YO_2$ | 0.01–0.60 | 0.10–0.30 |
| $H_2O/YO_2$ | 10–120 | 20–50 |
| $Q/YO_2$ | 0.02–1.00 | 0.02–0.10 |
| $YO_2/W_aO_b$ | 10–200 | 15–120 |
| $Z/YO_2$ | 0.05–1.00 | 0.20–0.40 | where M, n, Y, Q, W, a, and b are as defined above and Z is an amine component comprising at least one amine chosen from amines containing from one to eight carbon atoms, ammonium hydroxide and mixtures thereof.

The amine component comprises at least one amine chosen from amines containing from one to eight carbon atoms, ammonium hydroxide and mixtures thereof. These amines tend to be smaller than the SDA used to prepare the zeolite. As used herein, the term "smaller", when used with respect to the amine component, means that the amine is lower in molecular weight than the SDA and typically is no larger physically than the SDA. Non-exclusive examples of these amines include isopropylamine, isobutylamine, n-butylamine, piperidine, 4-methylpiperidine, cyclohexylamine, 1,1,3,3-tetramethyl butylamine, cyclopentylamine and mixtures of such amines.

Silicoaluminophosphates can be prepared by conventional techniques such as those disclosed in U.S. Pat. No. 4,440,871, issued Apr. 3, 1984 to Lok et al., and U.S. Pat. No. 4,493,424, issued Jul. 24, 1990 to Miller, both of which are incorporated herein by reference in their entirety. The overall procedure is similar to that described above for zeolites using a reaction mixture composition expressed in terms of molar oxide ratios as follows:

$$aX_2O:(Si_xAl_yP_z)O_2:hH_2O$$

where X is an SDA, a has a value great enough to constitute an effective concentration and is in the range of from greater than 0 to 3, h has a value of from 0 to 500, x, y and z represent the mole fractions, respectively, of silicon, aluminum and phosphorus in the SAP constituent, and each has a value of at least 0.01. The reaction mixture may also contain alkali metal cations. Typically, the source of phosphorus is phosphoric acid, the aluminum source may be an aluminum alkoxide, and silica is a typical source of silicon.

The aluminophosphates can be prepared in a manner very similar to that used to make SAPO's, except that no silicon is present. Such a method is disclosed in U.S. Pat. No. 4,310,440, issued Jan. 12, 1982 to Wilson, et al., which is incorporated by reference herein in its entirety. The reaction mixture can have a composition, in terms of molar ratios of oxides, as follows:

$$Al_2O_3:1\pm0.5P_2O_5:7-100\ H_2O$$

and containing from about 0.2 to 2.0 moles of an SDA per mole of $Al_2O_3$. Starting materials can be the same as those used to make SAPO's.

The methods described above for making the various microporous solids generally involve a starting mixture that is an aqueous solution or gel. However, the microporous solids can also be made by the method disclosed in U.S. Pat. No. 5,514,362, issued May 7, 1996 to Miller, and U.S. Pat. No. 5,558,851, issued Sep. 24, 1996 to Miller, both of which are incorporated herein by reference in their entirety. This method uses considerably less liquid than the traditional solution methods. In accordance with the method disclosed in those patents, the microporous solid can be made by a. preparing a reaction mixture comprising at least one active source of reactants required to produce the microporous solid, a structure directing agent capable of forming said crystalline zeolite, and sufficient water to shape said mixture into a self-supporting shape; and b. heating said reaction mixture at crystallization conditions and in the absence of an external liquid phase for sufficient time to form the microporous solid containing the structure directing agent.

Like the microporous solids made by conventional solution methods, the microporous solid resulting from this process will contain the SDA in its pores. The SDA can then be removed from the pores of the microporous solid by cleaving the SDA within the pores of the microporous solid and removing the SDA fragments in the manner described herein.

One type of SDA useful in the present invention are ammonium-acetals. As used herein, the term "ammonium-acetal" refers to organic compounds that contain both a quaternary ammonium portion and an acetal portion (the acetal portion being two ether groups attached directly to the same carbon atom). Examples of ammonium-acetals include, but are not limited to, compounds having the following

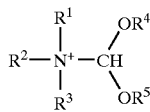

general formulas:
where $R^1$, $R^2$ and $R^3$ are each independently lower alkyl (e.g., methyl, ethyl, propyl or butyl), preferably methyl, and $R^4$ and $R^5$ are each independently lower alkyl (e.g., methyl, ethyl, propyl or butyl), preferably ethyl.

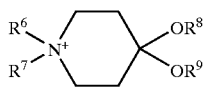

where $R^6$ and $R^7$ are each independently lower alkyl (e.g., methyl, ethyl, propyl or butyl), or $R^6$ and $R^7$ together form a five or six membered, substituted or unsubstituted ring with the nitrogen atom, and $R^8$ and $R^9$ are each independently lower alkyl (e.g., methyl, ethyl, propyl or butyl), or $R^8$ and $R^9$ together are —$CH_2CH_2$—, i.e., they form a form a five membered ring.

Examples of specific ammonium-acetals include, but are not limited to, the following compounds:

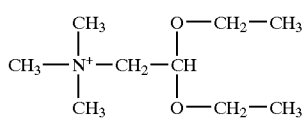
SDA 1

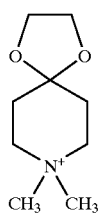
SDA 3

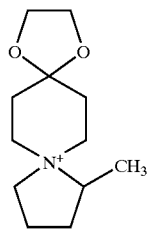
SDA 4

One method of cleaving the ammonium-acetals is by contacting them with HCl. This can be done by passing HCl through water to produce gas phase water saturated with HCl. The microporous solid containing the ammonium-acetal is then contacted with the gas phase water saturated with HCl at elevated temperature (i.e., high enough to maintain the water in the gaseous phase, e.g., about 120° C.). The ammonium-acetal is cleaved into an ammonium-diol (i.e., the two ether groups in the ammonium-acetal have been converted to hydroxyls) and two moles of alcohol.

One advantage of using an ammonium-acetal as the SDA is that the reaction which cleaves it into an ammonium-diol and alcohol is readily reversible to produce the original ammonium-acetal. Thus, if the ammonium-diol is reacted with alcohol, the original SDA can be recreated.

EXAMPLES

Example 1

Synthesis of 2,2-Diethoxyethyltrimethylammonium Cation (SDA 1)

Ten grams of dimethylaminoacetaldehyde diethyl acetal (95% Aldrich) is dissolved in 70 ml of chloroform. 17.60 Grams (0.124 mol) of iodomethane (95% Aldrich)is added to the resulting solution over ten minutes. The resulting solution is stirred overnight. Diethyl ether is added to the solution. Yellow solids form and are collected by filtration and washed with ether. The solids are recrystallized from hot acetone/diethyl ether. A small amount of methanol is added to aid dissolution. Bio-RAD AG1-X8 anion exchange resin is used to convert the iodide salt to the corresponding hydroxide form in 100% yield.

Example 2

Dissociation of SDA 1

A solution containing 8.11 grams of SDA 1 (hydroxide form) and 16.22 grams of water is mixed with 100 ml of 1N HCl and refluxed for two hours at 100° C. Upon cooling, the solution is analyzed by NMR which shows the ethoxy groups in SDA 1 are converted to alcohols.

This example demonstrates that SDA 1 can be cleaved into a diol and ethanol.

Example 3

Doping of SDA 1 into Zeolite Beta 0.31 Gram of preformed calcined boron zeolite beta is stirred in 50 ml of 0.01 M solution of SDA 1 for six hours at room temperature. The pH is 11.94. The doped zeolite is washed with deionized water and dried. 0.29 Gram of preformed calcined silica zeolite beta is stirred in 500 ml of 0.0002 M SDA 1 solution for six hours at room temperature. The pH is 10.25. The resulting doped zeolite is washed with deionized water and dried.

NMR analysis indicates that SDA 1 is doped into the pores of the zeolite beta.

Example 4

Cleavage of SDA 1 within the Pores of Zeolite Beta 0.60 Gram of boron zeolite beta doped with SDA 1 in a manner similar to that of Example 3 is put in a reactor and the temperature of the reactor is raised to 120° C. After Ar purge for one hour, HCl gas (produced by passing HCl gas through a vessel containing water to produce HCl gas that is saturated with water) is introduced into the reactor. The flow of water-saturated HCl gas is maintained for one hour. The reactor is purged again with Ar for one hour.

NMR analysis of the resulting product shows that the SDA 1 acetal is completely cleaved inside the zeolite beta pores into a diol and ethanol.

Example 5

Synthesis of Dimethylated Ammonium Cation of 1.4-Dioxa-8-azaspiro[4,5]decane (SDA 3)

4.00 Grams (0.028 mol) of 1,4-dioxa-8-azaspiro[4,5] decane (98% Aldrich), 8.01 grams (0.043 mol) of tributylamine (99%, Aldrich), and 30 ml of methanol are mixed in a flask and 12.20 grams (0.086 mol) of iodomethane (99.5%, Aldrich) is added dropwise over a period of ten minutes. The mixture is refluxed for five days at room temperature. Yellow solids are produced. After adding ethyl ether to the mixture, the solids are filtered and washed with ethyl ether. The solids are recrystallized from hot acetone/methanol. Iodine salts are converted to the corresponding hydroxide form in 90.2% yield using Bio-Rad AG1-X8 anion exchange resin. The resulting product is SDA 3.

Example 6

Synthesis of ZSM-5 Using SDA 3

0.20 Gram (0.0027 mol) of isobutylamine (99%, Aldrich) is added to a mixture of 0.095 gram (0.0005 mol) of hydroxide form SDA 3 and 11.40 gram (0.6326 mol) of water. 0.2 Gram (0.0036 mol) of potassium hydroxide and 0.083 gram (0.0011 mol) of aluminum hydroxide (Reheis 2000) are added to the mixture which is stirred to get a clear solution. 0.9 Gram (0.0150 mol) of silica (Cab-O-Sil M5) is added to the solution which is stirred for two hours to get a homogeneous gel. The resulting mixture is charged into a rotating (100 rpm) Teflon lined autoclave and heated at 443° K. for six days. After crystallization, the autoclave is cooled to room temperature. The solid product is collected by filtration, repeatedly washed with deionized water and dried overnight. X-ray diffraction indicates the product to be ZSM-5. NMR analysis shows that the pores of the ZSM-5 contain both SDA 3 and isobutylamine.

Example 7

Synthesis of SDA 4

10.02 Grams of 1,4-dioxa-8-azaspiro[4,5]decane (98%, Aldrich) and 18.54 grams of tributylamine (99%, Aldrich) are added to 100 ml of methanol. 16.10 Grams of 1,4-dibromopentane (97%, Aldrich) is added dropwise to the mixture in a cooled ice bath. The resulting mixture is stirred for several hours and the ice bath is removed. The mixture is stirred for five days more at room temperature. It is checked that the reaction is completed by thin layer chromatography. After the resulting solution is concentrated in a rotary evaporator, the residual oil is re-extracted with chloroform. The solution is concentrated again. Acetone is added to the concentrated solution, and white solids are obtained. These solid are recrystallized from hot methanol/acetone by a rotary evaporation. Bio-Rad AGI-X8 anion exchange resin is used to convert the bromide salt to the corresponding hydroxide form. The OH-concentration is determined by titration.

Example 8

Cleavage of SDA 3 and Removal of its Fragments from ZSM-5 Pores

Using SDA 3 in its hydroxide form, the following reaction composition (expressed as mole ratios) gives ZSM-5 after heating at 170° C. at 100 rpm:

0.033 SDA 3:0.238 KOH:0.056 Al(OH)$_3$:42.23 H$_2$O:1.0 SiO$_2$

The SiO$_2$/Al$_2$O$_3$ ratio in the formed ZSM-5 is approximately 31.

The choice of using a cyclic acetal is to provide a SDA that would remain intact at zeolite synthesis conditions (high pH) and be cleavable at conditions that would not destroy the zeolite (low pH). $^{13}$C NMR analysis shows that the as-synthesized ZSM-5 contains intact SDA 3.

When the ZSM-5 is contacted with 1M HCl solution at 80° C. for 20 hrs, the $^{13}$C CP MAS NMR spectrum is consistent with the presence of the ketone fragments that would result from cleaving the SDA 3. The carbonyl of the ketone fragments is also detected by IR (1741 cm$^{-1}$), and the weight of the organic components as assessed by thermogravimetric weight losses at temperatures between 200 and 700° C. decreases from 6.2 wt % to 4.6 wt % (consistent with the loss of ethylene glycol). The HCl solution after the cleavage reaction is collected, concentrated, and then analyzed by $^{13}$C NMR. Only ethylene glycol is detected at 62.8 ppm.

Exposure to a mixture of 0.01M NaOH and 1M NaCl at 100° C. for 72 hours removes the ketone fragments. Additionally, the ion-exchanged ZSM-5 now has porosity (N$_2$ adsorption capacity of 0.14 cc liquid N$_2$/g dried ZSM-5) that was not present prior to this treatment (as-synthesized ZSM-5 showed no microporosity while the calcined ZSM-5 gave 0.15 cc/g). When the as-synthesized solid is not treated with HCl solution, the ion-exchange step does not cause the removal of the SDA 3. Thus, the fragmentation of SDA 3 is essential for its removal from the zeolite pores. The ketone fragment is detected in the solution after the ion-exchange by electrospray mass spectrometer. After NaOH/NaCl treatment, the powder X-ray diffraction data show no loss in structural integrity of the ZSM-5.

Example 9

Catalytic Activity

The catalytic activity of this ZSM-5 is evaluated using the conversion of methanol to higher hydrocarbons as the test reaction. The ZSM-5 is ion exchanged with NH$_4^+$ cations by known techniques. The ZSM-5, after heating to 540° C. to convert NH$_4^+$ to H$^+$, is pelletized at 2–3 KPSI, then crushed and meshed to 20–40 mesh. 0.50 Gram is loaded into a ⅜ inch stainless steel reactor tube with alundum on the side of the zeolite bed where the feed is introduced. The reactor is heated in a Lindberg furnace to 1000° F. for three hours in air, and then the temperature is reduced to 330° C. in a stream of nitrogen at 20 cc/min. A 22.1% methanol feed (22.1 g methanol/77.9 g water) is introduced into the reactor at a rate of 1.31 cc/hr.

The product slate of individual hydrocarbons is virtually identical in distribution to that obtained from a vendor sample of ZSM-5 (see the table below).

Other zeolites (ZSM-11, ZSM-12) are prepared using this generalized methodology.

|  | Vendor ZSM-5 | Example 8 |
|---|---|---|
| Temp | 370° C. | 400° C. |
| Feed (% methanol in water) | 100 | 22 |
| Conversion | 99 | 97 |

| -continued | |
|---|---|
| Hydrocarbon[a] | Hydrocarbon distribution (wt %) |
| C1 | 0.5 0.6 |
| C2 | 7 7.5 |
| C3 | 17 23 |
| C4 | 26 24 |
| C5 | 22 20 |
| Ar6 | 1.5 0.4 |
| Ar7 | 3 1 |
| Ar8 | 8 6 |
| Ar9 | 3 10.5 |
| Ar10 | 3 3 |

[a]Ci denotes all non–aromatic hydrocarbons of i carbon number. Ari denotes all aromatic hydrocarbons of i carbon number.

What is claimed is:

1. A method of removing a structure directing agent from a microporous solid at a temperature below the temperature that would cause the structure directing agent to decompose comprising cleaving the structure directing agent within the pores of the microporous solid, at a temperature below the temperature that would cause the structure directing agent to decompose, into two or more fragments and removing the fragments from the pores of the microporous solid at a temperature below the temperature that would cause the structure directing agent or its fragments to decompose.

2. The method of claim 1 wherein the microporous solid is an inorganic oxide, inorganic sulfide, molecular sieve, zeolite, aluminophosphate, silicoaluminophosphate or hetero polytungstate.

3. The method of claim 2 wherein the microporous solid is an inorganic oxide or inorganic sulfide.

4. The method of claim 2 wherein the microporous solid is a molecular sieve.

5. The method of claim 2 wherein the microporous solid is a zeolite.

6. The method of claim 5 wherein the molecular sieve is zeolite beta, ZSM-5, SSZ-25, SM-3, SSZ-32, SSZ-13, SSZ-33 or ZSM-23.

7. The method of claim 2 wherein the microporous solid is an aluminophosphate or silicoaluminophosphate.

8. The method of claim 1 wherein the temperature at which the structure directing agent is removed is below 300° C.

9. The method of claim 1 wherein the structure directing agent can not be removed from the pores of the molecular sieve by solvent extraction prior to cleaving it.

10. The method of claim 1 further comprising recovering the fragments of the cleaved structure directing agent and restoring it to its original chemical structure.

11. The method of claim 1 wherein the structure directing agent is an ammonium-acetal.

12. The method of claim 11 wherein the ammonium-acetal has the general formula

where $R^1$, $R^2$ and $R^3$ are each independently lower alkyl and $R^4$ and $R^5$ are each independently lower alkyl.

13. The method of claim 11 wherein the ammonium-acetal has the general formula

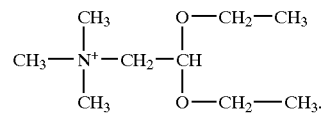

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —$CH_2CH_2$— and form a five membered ring.

14. The method of claim 12 wherein the ammonium-acetal is $$CH_3-\underset{\underset{CH_3}{|}}{\overset{\overset{CH_3}{|}}{N^+}}-CH_2-\underset{\underset{O-CH_2-CH_3}{|}}{\overset{\overset{O-CH_2-CH_3}{|}}{CH}}$$

15. The method of claim 13 wherein the ammonium-acetal is

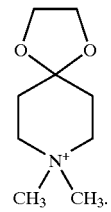

16. The method of claim 13 wherein the ammonium acetal is

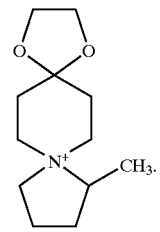

17. The method of claim 10 wherein the cleaved structure directing agent comprises an ammonium-diol compound, and it is restored to its original ammonium-acetal chemical structure by reaction with an alcohol.

18. A method of removing a structure directing agent from a porous molecular sieve at a temperature below the temperature that would cause the structure directing agent to decompose comprising cleaving the structure directing agent within the pores of the molecular sieve, at a temperature below the temperature that would cause the structure directing agent to decompose, into two or more fragments and removing the fragments from the pores of the molecular sieve at a temperature below the temperature that would cause the structure directing agent or its fragments to decompose.

19. The method of claim 18 wherein the temperature at which the structure directing agent is removed is below 300° C.

20. The method of claim 18 wherein the structure directing agent can not be removed from the pores of the molecular sieve by solvent extraction prior to cleaving it.

21. The method of claim 18 further comprising recovering the fragments of the cleaved structure directing agent and restoring it to its original chemical structure.

22. The method of claim 18 wherein the structure directing agent is an ammonium-acetal.

23. The method of claim 22 wherein the ammonium-acetal has the general formula

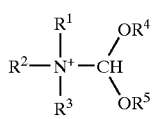

where $R^1$, $R^2$ and $R^3$ are each independently lower alkyl and $R^4$ and $R^5$ are each independently lower alkyl.

24. The method of claim 22 wherein the ammonium-acetal has the general formula

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —$CH_2CH_2$— and form a five membered ring.

25. The method of claim 23 wherein the ammonium-acetal is

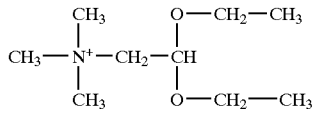

26. The method of claim 24 wherein the ammonium-acetal is

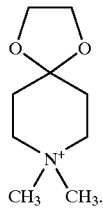

27. The method of claim 24 wherein the ammonium acetal is

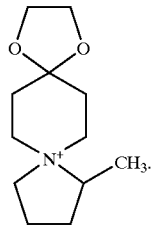

28. The method of claim 21 wherein the cleaved structure directing agent comprises an ammonium-diol compound, and it is restored to its original ammonium-acetal chemical structure by reaction with an alcohol.

29. The method of claim 18 wherein the molecular sieve is a zeolite.

30. The method of claim 18 wherein the molecular sieve is zeolite beta, ZSM-5, SSZ-25, SM-3, SSZ-32, SSZ-13, SSZ-33 or ZSM-23.

31. The method of claim 18 wherein the molecular sieve is an aluminophosphate or silicoaluminophosphate.

32. A method of making a porous, crystalline molecular sieve comprising:
(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) a structure directing agent capable of forming the molecular sieve;
(b) maintaining the aqueous solution under conditions sufficient to form porous crystals of the molecular sieve which contain the structure directing agent in the pores; and
(c) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

33. The method of claim 32 wherein the temperature in step (c) is below 300° C.

34. The method of claim 32 wherein the structure directing agent can not be removed from the pores of the molecular sieve by solvent extraction prior to cleaving it.

35. The method of claim 32 further comprising recovering the fragments of the cleaved structure directing agent and restoring it to its original chemical structure.

36. The method of claim 32 wherein the molecular sieve is a zeolite.

37. The method of claim 32 wherein the molecular sieve is zeolite beta, ZSM-5, SSZ-25, SM-3, SSZ-32, SSZ-13, SSZ-33 or ZSM-23.

38. The method of claim 32 wherein the molecular sieve is an aluminophosphate or silicoaluminophosphate.

39. The method of claim 32 wherein the structure directing agent is an ammonium-acetal.

40. The method of claim 39 wherein the ammonium-acetal has the general formula

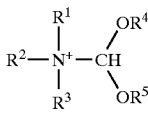

where $R^1$, $R^2$ and $R^3$ are each independently lower alkyl and $R^4$ and $R^5$ are each independently lower alkyl.

41. The method of claim 39 wherein the ammonium-acetal has the general formula

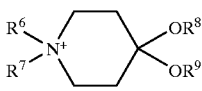

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —$CH_2CH_2$— and form a five membered ring.

42. The method of claim 40 wherein the ammonium-acetal is

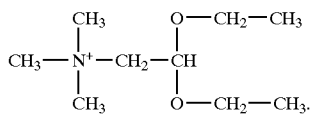

43. The method of claim 41 wherein the ammonium-acetal is

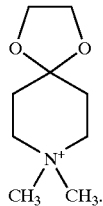

44. The method of claim 41 wherein the ammonium acetal is

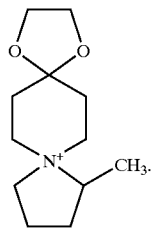

45. The method of claim 35 wherein the cleaved structure directing agent comprises an ammonium-diol compound, and it is restored to its original ammonium-acetal chemical structure by reaction with an alcohol.

46. A method of making a porous, crystalline molecular sieve comprising:
   (a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) a structure directing agent capable of forming the molecular sieve; and (5) an amine component comprising at least one amine containing one to eight carbon atoms, ammonium hydroxide and mixtures thereof;
   (b) maintaining the aqueous solution under conditions sufficient to form porous crystals of the molecular sieve which contain the structure directing agent and the amine component in the pores;
   (c) removing the amine component from the pores of the molecular sieve at a temperature below the temperature that would cause the structure directing agent or the amine component to decompose; and
   (d) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

47. The method of claim 46 wherein the structure directing agent is an ammonium-acetal compound.

48. The method of claim 47 wherein the ammonium-acetal has the general formula

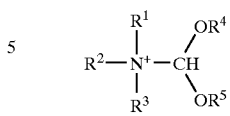

where $R^1$, $R^2$ and $R^3$ are each independently lower alkyl and $R^4$ and $R^5$ are each independently lower alkyl.

49. The method of claim 47 wherein the ammonium-acetal has the general formula

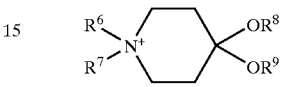

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —$CH_2CH_2$— and form a five membered ring.

50. The method of claim 48 wherein the ammonium-acetal is

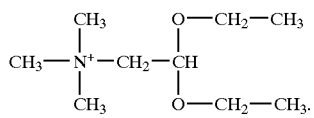

51. The method of claim 49 wherein the ammonium-acetal is

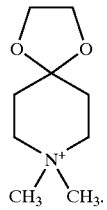

52. The method of claim 49 wherein the ammonium acetal is

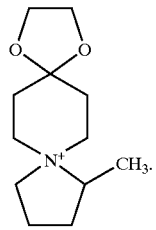

53. The method of claim 46 further comprising recovering the fragments of the cleaved structure directing agent and restoring it to its original chemical structure.

54. The method of claim 53 wherein the cleaved structure directing agent comprises an ammonium-diol compound, and it is restored to its original ammonium-acetal chemical structure by reaction with an alcohol.

55. The method of claim 46 wherein the amine component is isopropylamine, isobutylamine, n-butylamine, piperidine, 4-methylpiperidine, cyclohexylamine, 1,1,3,3-tetramethyl butylamine, or cyclopentylamine.

56. The method of claim 55 wherein the amine component is isobutylamine.

57. The method of claim 46 wherein the wherein the amine component is removed by solvent extraction.

58. The method of claim 57 wherein the solvent is dimethylformamide.

59. The method of claim 57 wherein the solvent is ethylene glycol.

60. The method of claim 46 wherein the molecular sieve is a zeolite.

61. The method of claim 46 wherein the molecular sieve is zeolite beta, ZSM-5, SSZ-25, SM-3, SSZ-32, SSZ-13, SSZ-33 or ZSM-23.

62. The method of claim 46 wherein the molecular sieve is an aluminophosphate or silicoaluminophosphate.

63. A method of making a microporous solid comprising:
(a) preparing a reaction mixture comprising at least one active source of reactants required to produce the microporous solid, a structure directing agent capable of forming said microporous solid, and sufficient water to shape said mixture into a self-supporting shape;
(b) heating said reaction mixture at crystallization conditions and in the absence of an external liquid phase for sufficient time to form the microporous solid containing the structure directing agent; and
(c) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

64. The method of claim 63 wherein the temperature in step (c) is below 300° C.

65. The method of claim 63 wherein the structure directing agent can not be removed from the pores of the microporous solid by solvent extraction prior to cleaving it.

66. The method of claim 63 further comprising recovering the fragments of the cleaved structure directing agent and restoring it to its original chemical structure.

67. The method of claim 63 wherein the microporous solid is an inorganic oxide, inorganic sulfide, molecular sieve, zeolite, aluminophosphate, silicoaluminophosphate or hetero polytungstate.

68. The method of claim 63 wherein the microporous solid is a molecular sieve.

69. The method of claim 63 wherein the microporous solid is a zeolite.

70. The method of claim 68 wherein the molecular sieve is zeolite beta, ZSM-5, SSZ-25, SM-3, SSZ-32, SSZ-13, SSZ-33 or ZSM-23.

71. The method of claim 68 wherein the molecular sieve is an aluminophosphate or silicoaluminophosphate.

72. The method of claim 63 wherein the structure directing agent is an ammonium-acetal.

73. The method of claim 72 wherein the ammonium-acetal has the general formula

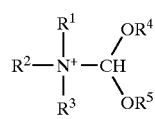

where $R^1$, $R^2$ and $R^3$ are each independently lower alkyl and $R^4$ and $R^5$ are each independently lower alkyl.

74. The method of claim 72 wherein the ammonium-acetal has the general formula

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —$CH_2CH_2$— and form a five membered ring.

75. The method of claim 73 wherein the ammonium-acetal is

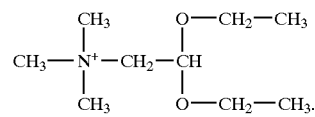

76. The method of claim 74 wherein the ammonium-acetal is

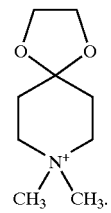

77. The method of claim 74 wherein the ammonium acetal is

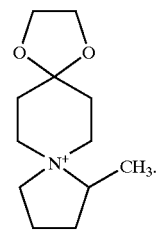

78. The method of claim 66 wherein the cleaved structure directing agent comprises an ammonium-diol compound, and it is restored to its original ammonium-acetal chemical structure by reaction with an alcohol.

79. A method of making a microporous solid comprising:
(a) preparing a reaction mixture comprising at least one active source of reactants required to produce the microporous solid, a structure directing agent capable of forming said microporous solid, an amine component comprising at least one amine containing one to eight carbon atoms, ammonium hydroxide and mixtures thereof, and sufficient water to shape said mixture into a self-supporting shape;
(b) heating said reaction mixture at crystallization conditions and in the absence of an external liquid phase for sufficient time to form the microporous solid containing the structure directing agent and the amine component; and
(c) removing the amine component from the pores of the molecular sieve at a temperature below the temperature that would cause the structure directing agent or the amine component to decompose; and (d) cleaving the structure directing agent, at a temperature below the temperature that would cause the structure directing agent to decompose, into two or more fragments and removing the fragments from the molecular sieve at a temperature below the temperature that would cause the structure directing agent or its fragments to decompose.

80. The method of claim 79 wherein the temperature in step (c) is below 300° C.

81. The method of claim 79 wherein the structure directing agent can not be removed from the pores of the microporous solid by solvent extraction prior to cleaving it.

82. The method of claim 79 further comprising recovering the fragments of the cleaved structure directing agent and restoring it to its original chemical structure.

83. The method of claim 79 wherein the microporous solid is an inorganic oxide, inorganic sulfide, molecular sieve, zeolite, aluminophosphate, silicoaluminophosphate or hetero polytungstate.

84. The method of claim 79 wherein the microporous solid is a molecular sieve.

85. The method of claim 79 wherein the microporous solid is a zeolite.

86. The method of claim 84 wherein the molecular sieve is zeolite beta, ZSM-5, SSZ-25, SM-3, SSZ-32, SSZ-13, SSZ-33 or ZSM-23.

87. The method of claim 84 wherein the molecular sieve is an aluminophosphate or silicoaluminophosphate.

88. The method of claim 79 wherein the structure directing agent is an ammonium-acetal compound.

89. The method of claim 88 wherein the ammonium-acetal has the general formula $$R^2-\underset{\underset{R^3}{|}}{\overset{\overset{R^1}{|}}{N^+}}-CH\overset{OR^4}{\underset{OR^5}{\diagdown}}$$

where $R^1$, $R^2$ and $R^3$ are each independently lower alkyl and $R^4$ and $R^5$ are each independently lower alkyl.

90. The method of claim 88 wherein the ammonium-acetal has the general formula

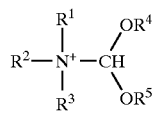

where $R^6$ and $R^7$ are each independently lower alkyl, or $R^6$ and $R^7$ together form a five or six membered, substituted or unsubstituted ring with the nitrogen atom, and $R^8$ and $R^9$ are each independently lower alkyl, or $R^8$ and $R^9$ together are —CH$_2$CH$_2$— and form a five membered ring.

91. The method of claim 89 wherein the ammonium-acetal is

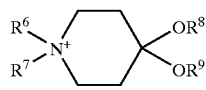

92. The method of claim 90 wherein the ammonium-acetal is

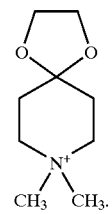

93. The method of claim 90 wherein the ammonium acetal is

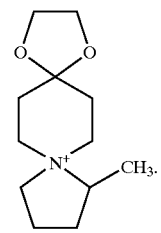

94. The method of claim 79 further comprising recovering the fragments of the cleaved structure directing agent and restoring it to its original chemical structure.

95. The method of claim 94 wherein the cleaved structure directing agent comprises an ammonium-diol compound, and it is restored to its original ammonium-acetal chemical structure by reaction with an alcohol.

96. The method of claim 79 wherein the amine component is isopropylamine, isobutylamine, n-butylamine, piperidine, 4-methylpiperidine, cyclohexylamine, 1,1,3,3-tetramethyl butylamine, or cyclopentylamine.

97. The method of claim 96 wherein the amine component is isobutylamine.

98. The method of claim 79 wherein the wherein the amine component is removed by solvent extraction.

99. The method of claim 98 wherein the solvent is dimethylformamide.

100. The method of claim 98 wherein the solvent is ethylene glycol.

* * * * *